(12) United States Patent
Vandorpe et al.

(10) Patent No.: US 7,576,932 B2
(45) Date of Patent: Aug. 18, 2009

(54) PRISM ASSEMBLY

(75) Inventors: Krist Vandorpe, Beveren-Leie (BE); Nico Coulier, Zulte (BE); Peter Gerets, Roeselare (BE); Stefan Lesschaeve, Oudenaarde (BE)

(73) Assignee: Barco, Naamloze Vennootschap, Kortrijk (BE)

( * ) Notice: Subject to any disclaimer, the term of this patent is extended or adjusted under 35 U.S.C. 154(b) by 0 days.

(21) Appl. No.: 11/210,744

(22) Filed: Aug. 25, 2005

(65) Prior Publication Data

US 2006/0044654 A1    Mar. 2, 2006

Related U.S. Application Data

(60) Provisional application No. 60/606,125, filed on Sep. 1, 2004.

(51) Int. Cl.
*G02B 5/04* (2006.01)

(52) U.S. Cl. ........................... 359/834; 359/837

(58) Field of Classification Search ............ 353/33
See application file for complete search history.

(56) References Cited

U.S. PATENT DOCUMENTS

| 6,350,033 | B1 | 2/2002 | Fujimori | |
| 6,873,639 | B2* | 3/2005 | Zhang | 372/69 |
| 2003/0151834 | A1* | 8/2003 | Penn | 359/833 |
| 2005/0162616 | A1* | 7/2005 | Gupta et al. | 353/33 |

* cited by examiner

*Primary Examiner*—Joshua L Pritchett
(74) *Attorney, Agent, or Firm*—Bacon & Thomas, PLLC

(57) ABSTRACT

A prism assembly including two or more prisms, at least one of which has or more surfaces that are used for total internal reflection or partial spectral reflection of incoming light, wherein at least a part of one of the surfaces used for reflection purposes is covered with an element that is spaced apart from the surface, such that a gap is defined in between the surface and the element, and wherein the gap is sealed with a seal that is applied on one of said prisms in order to prevent contaminants from entering the gap.

17 Claims, 10 Drawing Sheets

PRISM ASSEMBLY

This application claims the benefit of provisional application No. 60/606,125 under 35 U.S.C. § 119(e), and said provisional application is incorporated herein in its entirety by reference.

BACKGROUND OF THE INVENTION

1. Field of the Invention

The present invention relates to a prism assembly, more specifically a prism assembly consisting of two or more prisms, at least one of which comprises one or more surfaces that are used for total internal reflection or partial spectral reflection of incoming light.

In particular the present invention relates to sealing from atmospheric contaminants the air gaps, specifically, the air gaps between prisms and the air gaps between the prisms and the light reflecting valves or more precisely digital micromirror devices (DMD), in a digital light processing (DLP) engine.

2. Discussion of the Relelated Art

In the past, cathode ray tube (CRT) projectors were used for most projection applications, but they have largely been supplanted, because they are large in size, difficult to calibrate, must be used in very dark surroundings, and have a high susceptibility to frequent breakdowns. Digital projector systems have become increasingly popular over the past decade, because of their ability to project high-quality images for applications, such as, for example, boardroom presentations, home theater systems, and large-scale stadium concerts. Liquid crystal display (LCD) is one technology used in digital projectors, but visible pixilation issues and larger size, compared to that of DLP, are negatives associated with LCD technology. DLP is a competing technology and is prized for its compactness and ability to deliver high levels of contrast and brightness.

Dr. Larry Hornbeck invented DLP technology at Texas Instruments in 1987. Digital projectors that use DLP technology contain a DLP light engine. DLP light engines have a lamp which shines onto a digital multi-mirror device (DMD) chip and an array of microscopic mirrors, each of which directs the light that hits it in either the 'on-state' or the 'off-state.' The 'on-state' light reaches the screen and produces a white (or color) pixel, while the 'off-state' light is absorbed inside the projector, which results in a dark pixel. For the best light-output and color saturation, advanced DLP systems use 3 DMD chips, one each for red, green, and blue. The 3 DMD chips are combined by means of a Philips prism, which is a combination of 5 prisms. The prism apparatus utilizes total internal reflection (TIR), which requires the existence of air gaps of 5 micrometers (μm) to 1 millimeter (mm) between the various prisms.

However, the prisms used in DLP projectors are highly sensitive to contamination. Digital projectors are often used in high-stress environments, such as concerts, where dust, smoke, cracked oil, and other contaminants are present in the atmosphere. The air gaps in the prism configuration are susceptible to accumulating these contaminants, which often results in the projection of visual artifacts, such as colored spots. Contaminations can block light or nullify a TIR condition. Cleaning the prisms from the contaminants is impractical, because of the high cost and difficulty of cleaning. What is needed is a means of protecting the prisms and DMD chips in a DLP light engine from atmospheric contamination.

Currently, a popular procedure for protecting the light engine from contaminants is to enclose and protect the DLP engine in a metal box. An example of such an apparatus is seen in reference to U.S. Pat. No. 6,350,033, entitled "Projector." The '033 patent details a structure that encloses an optical path from an electro-optical apparatus to a projection lens by means of an attached air circulation path, which is disposed in a flow path for cooling air. Thus, the air circulation path is able to cool the air enclosed in the structure, while preventing dust or oil contamination. However, the '033 patent fails to provide a means of dissipating a sufficient amount of heat for normal projector operation when the light illuminates greater than 5,000 lumens. If the heat is not sufficiently dissipated, sensitive optics may warp, which causes visual artifacts to appear on the projected images and other negative effects. Excessive heat may also damage the DMD chips. Therefore, what is further needed is a means of permitting sufficient heat dissipation from the prisms and DMD chips in a DLP light engine.

To project a visual-artifact-free image, all TIR conditions must be preserved, and light must be allowed to pass through all the necessary areas of the prisms in the DLP light engine. Thus, what is further needed is a means of fulfilling all TIR conditions and allowing light to pass through all necessary areas in the prisms and DMD chips in a DLP light engine.

SUMMARY OF THE INVENTION

It is therefore an object of the invention to provide means to prevent contaminants of entering a gap between the surface of a prism and an element covering a surface of said prism that is used for total internal reflection or partial spectral reflection of incoming light.

In particular it is an object of this invention to provide a means of protecting the prisms and DMD chips in a DLP light engine from atmospheric contamination.

It is another object of this invention to provide a means of permitting sufficient heat dissipation from the prisms and DMD chips in a DLP light engine.

In order to fulfill the above mentioned objects, the present invention relates to a prism assembly consisting of two or more prisms, at least one of which comprises one or more surfaces that are used for total internal reflection or partial spectral reflection of incoming light, wherein at least a part of one of said surfaces used for reflection purposes is covered with an element that is spaced apart from said surface, such that a gap is defined in between said surface and said element, and wherein said gap is sealed with a seal that is applied on one of said prisms in order to prevent contaminants from entering said gap.

It is yet another object of this invention to provide a means of fulfilling all TIR conditions and allowing light to pass through all necessary areas in the prisms and DMD chips in a DLP light engine.

Hereto, the invention also relates to a digital light processing prism apparatus comprising a total internal reflection (TIR) prism assembly and a color prism assembly, whereby the TIR prism assembly consists of two triangular prisms extending in a first direction, which TIR-prisms are facing each other with one of their surfaces, whereby the color prism assembly consists of a quadrangular prism and two triangular prisms, which are orientated in a transversal direction in view of the TIR-prisms, and whereby the quadrangular prism has one surface facing a surface of a first of said color triangular prisms, which first triangular prism has a second surface facing a first surface of the second color triangular prism, said second color prism having a second surface, partially facing a surface of one of said TIR-prisms, wherein all of said facing surfaces are placed at a mutual distance of each other, such that a gap is formed in between each of said facing surfaces, wherein said gaps are sealed with a seal that is applied on said prisms.

In the case light reflecting valves or, more precisely digital multi-mirror devices are applied, it should be noticed that these light reflecting valves are preferably spaced apart from the corresponding surfaces of said color prisms, such that a gap is formed in between said light reflecting valves and their correspondent surface, whereby said gaps are sealed with a seal applied on said light reflecting valves and said prisms.

According to a preferred embodiment the outwardly orientated surfaces of the TIR-prisms and the outwardly oriented surfaces of the color prisms that are used for total internal reflection or partial spectral reflection of an image building part of the incoming light, are covered with an element that is spaced apart from said surface, such that a gap is defined in between said surface and said element, and wherein said gap is sealed with a seal that is applied on one of said prisms in order to prevent contaminants from entering said gap.

DESCRIPTION OF A PREFERRED EMBODIMENT

The present invention relates to sealing from atmospheric contaminants the air gaps, specifically, the air gaps between prisms and the air gaps between the prisms and the digital micro-mirror devices (DMD), in a digital light processing (DLP) engine.

Figure 1:
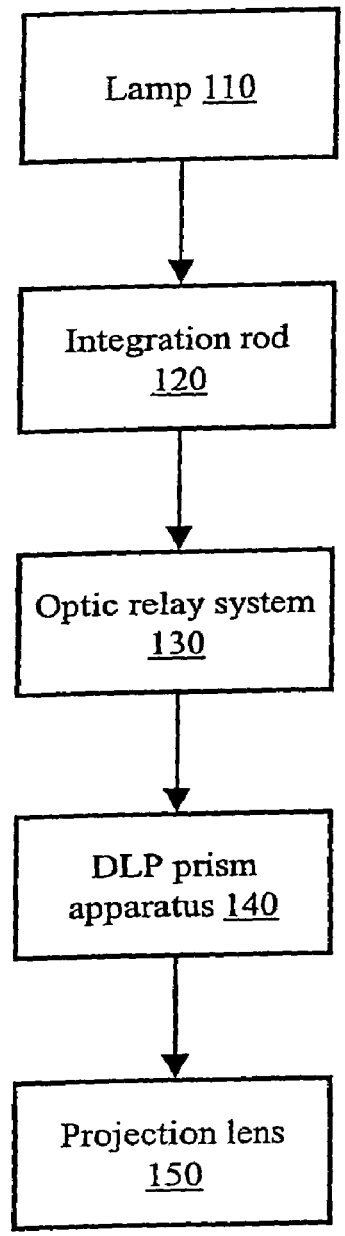
FIG. 1 illustrates a functional block diagram of a generic DLP-light engine system in accordance with the invention.

FIG. 1 illustrates a functional block diagram of a generic DLP light engine system 100. Generic DLP light engine system 100 includes a lamp 110, an integration rod 120, an optic relay system 130, a DLP prism apparatus 140, and a projection lens 150. Lamp 110 is a standard lamp that is used in digital projection systems, for example a mercury or xenon bulb lamp. Lamp 110 shines onto integration rod 120, which conditions and manages the light for even distribution. Optic relay system 130, a set of 4-6 lenses, transmits the light from integration rod 120 towards DLP prism apparatus 140. DLP prism apparatus 140 is formed of blue, red, and green prisms, DMD chips, and DMD aperture plates and is further described in reference to FIGS. 2A, 2B, 2C, 3, 4A, and 4B. DLP prism apparatus 140 splits, reflects, and recombines the light for projection by projection lens 150. A typical projections lens 150 has a focal length of 30 to 60 mm, an f/number of f/2.5, a physical diameter of 120 mm and a physical length of 250 mm.

Figure 2A:
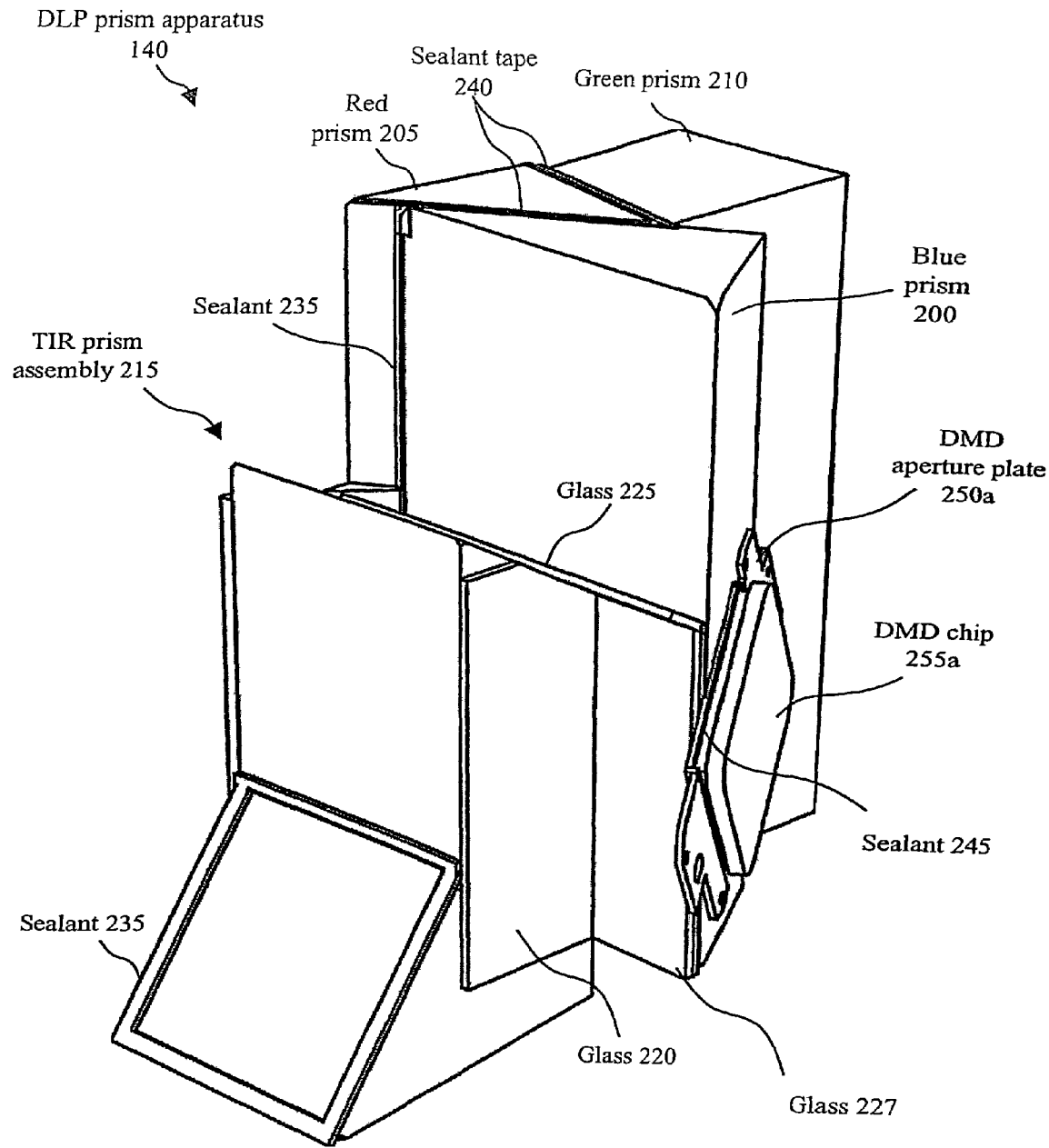
FIGS. 2A, 2B and 2C illustrate left, right and rear perspective views, respectively, of a DLP-prism apparatus according to the invention.
Figure 2B:
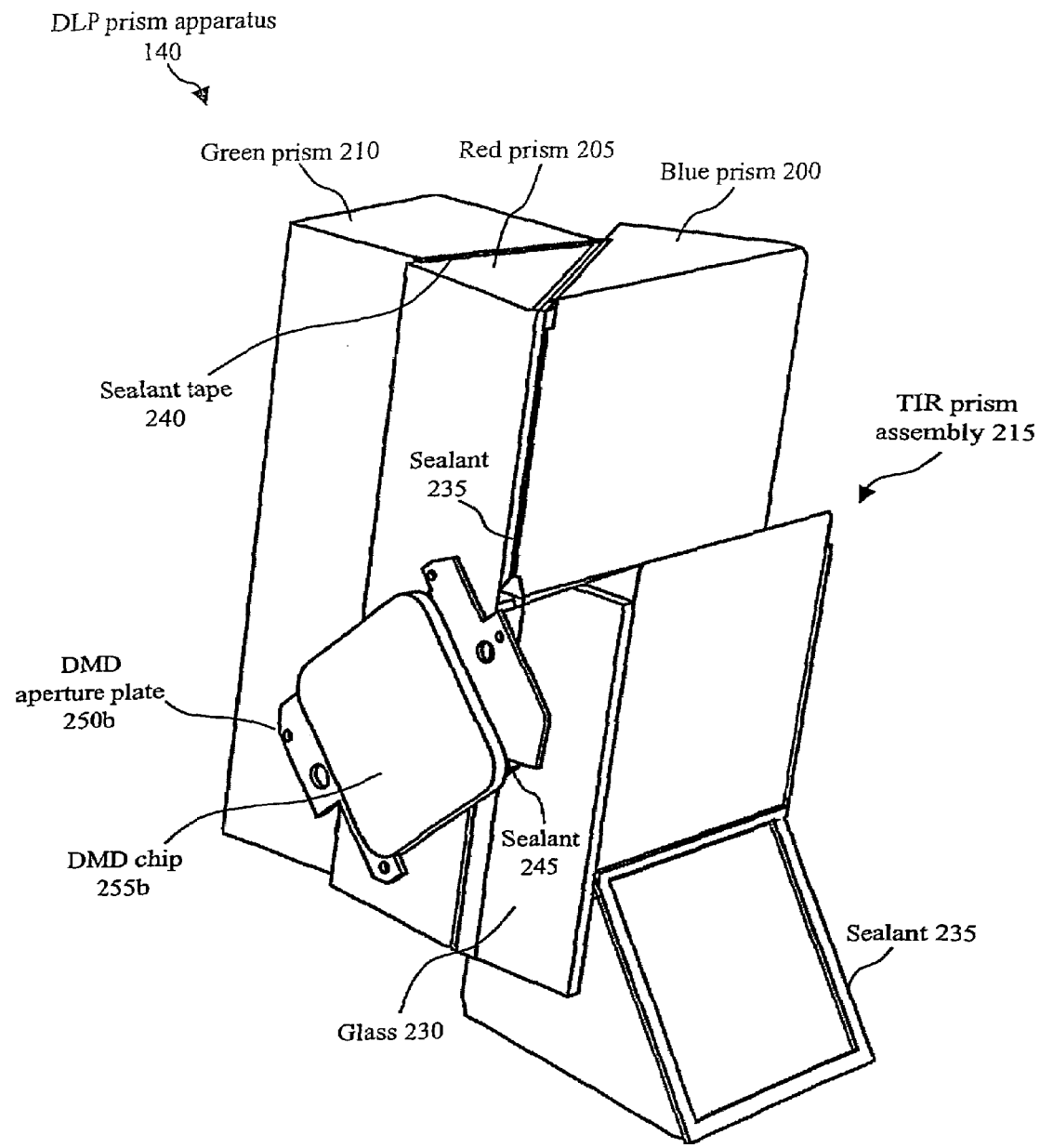
Figure 2C:
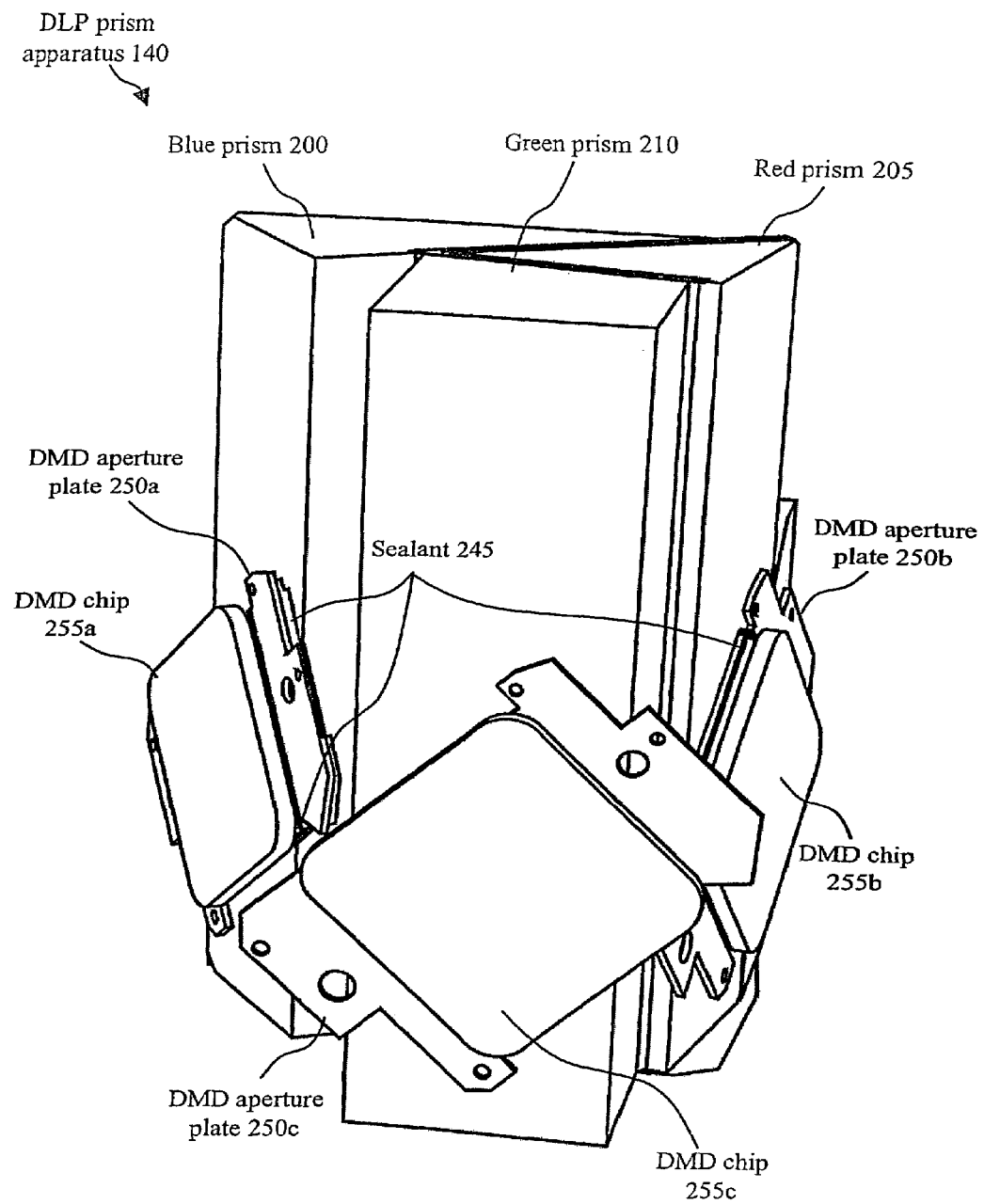

FIGS. 2A, 2B, and 2C illustrate left, right, and rear perspective views, respectively, of DLP prism apparatus 140. FIG. 2A includes a view of DLP prism apparatus 140, formed of a blue prism 200, a red prism 205, a green prism 210, a TIR prism assembly 215, a glass 220, a glass 225, a glass 227, a sealant 235, a tape sealant 240, a sealant 245, a DMD aperture plate 250a, and a DMD chip 255a.

With continuing reference to FIG. 2A, blue prism 200 is a triangular glass prism with a blue dichroic coating applied to separate blue light, such as those made by Konica-Minolta and others. Red prism 205 is a triangular glass prism with a red dichroic coating applied to separate red light, such as those made by Konica-Minolta and others. Green prism 210 is a quadrangular glass prism, through which the remaining light, which is the green light, passes. Green prism 210 is also made by Konica-Minolta and others. TIR prism assembly 215 is formed of two smaller, triangle-shaped prisms adhered together, such as those made by Konica-Minolta and others, which is not visible because of the position of glass 220. The dimensions of blue prism 200, red prism 205, green prism 210, and TIR prism assembly 215 range from 70-125 mm, measured along an optical axis, through the center of the DMD chip 255c and perpendicular to DMD chip 255c.

Glass 220 is a glass plate with dimensions of approximately 25×70×2 mm and is adhered to the left side of TIR prism assembly 215 by a transparent glue, such as Dymax OP-29. Glass 220 is sealed to blue prism 200 by sealant 235.

Sealant 235 is used to seal air gaps between blue prism 200, red prism 205, and green prism 210 on the TIR prism assembly 215, and to seal the air gap between TIR prism assembly 215 and blue prism 200. Sealant 235 is a temperature-resistant (up to 80° C.), ultraviolet (UV) resistant, flexible sealant of between 3-4 mm wide that does not discharge gas. In one example, sealant 235 is made of silicone or silicone rubber.

Glass 225 is a glass plate with dimensions of approximately 20×67×2 mm. Glass 225 is adhered to the top of TIR prism assembly 215 by a transparent glue, such as Dymax OP-29, and sealed to blue prism 200 by sealant 235. Glass 227 is a glass plate with dimensions of approximately 23×74×2 mm Glass 227 is adhered to glass 220 and glass 225 by use of a transparent glue, such as Dymax OP-29, and sealed to blue prism 200 by sealant 235.

Sealant tape 240 is a temperature-resistant (up to 80° C.), UV-resistant, flexible tape, 3-4 mm wide or less, that does not discharge gas. Tape sealant 240 is used to seal air gaps at the top of DLP prism apparatus 140. In one example, tape sealant 240 is made of silicone or silicone rubber. Tape sealant 240 is used to ensure that TIR conditions are not disrupted and that light is not blocked at the top of the apparatus, as may occur if a sealant were used instead.

Sealant 245 is temperature-resistant (up to 80° C.), UV-resistant, and very soft (e.g., silicone rubber), which ensures that the position of DMD chip 255a is not disturbed.

DMD aperture plate 250a is a thin black metal plate that absorbs stray light that would otherwise cause light to appear next to the screen, and is produced by Barco. DMD chip 255a is a micro-mirror array produced by Texas Instruments. DMD chip 255a is attached to DMD aperture plate 250a and sealed to blue prism 200 by sealant 245. DMD chip 255a may measure from 0.5-1.2 inches long, measured diagonally. An exemplary DMD chip is the super extended graphics array (SXGA)+0.95" chip, produced by Texas Instruments, with order number X1410-9021 IPV 9011.

FIG. 2B includes a glass 230, a DMD aperture plate 250b, and a DMD chip 255b. Glass 230 is identical to glass 220, as described in more detail in reference to FIG. 2A. DMD aperture plate 250b is identical to DMD aperture plate 250a as described in reference to FIG. 2A. DMD chip 255b is a micro-mirror array and is identical to DMD chip 255a, as described in more detail in reference to FIG. 2A. With continuing reference to FIGS. 2A and 2B, glass form 230 is adhered to the left side of TIR prism assembly 215 by a transparent glue such as Dymax OP-29, and sealed to blue prism 200 and red prism 205 by sealant 235. DMD chip 255b is attached to DMD aperture plate 250b and sealed to red prism 205 by sealant 245.

FIG. 2C includes a DMD aperture plate 250c and a DMD chip 255c. DMD aperture plate 250c is identical to DMD aperture plate 250a, as described in more detail in reference to FIG. 2A. DMD chip 255c is a micro-mirror array and is identical to DMD chip 255a, as described in more detail in reference to FIG. 2A. With continuing reference to FIG. 2A, B, and C, each DMD aperture plate 250 is attached to its corresponding DMD chip 255 (i.e., DMD aperture plate 250a is attached to DMD chip 255a, DMD aperture plate 250b is attached to DMD chip 255b, and DMD aperture plate 250c is attached to DMD chip 255c).

Sealant 245 seals each interface between each DMD aperture plate 250 and its corresponding prism, and between each DMD aperture plate 250 and its corresponding DMD chip 255.

Figure 3:
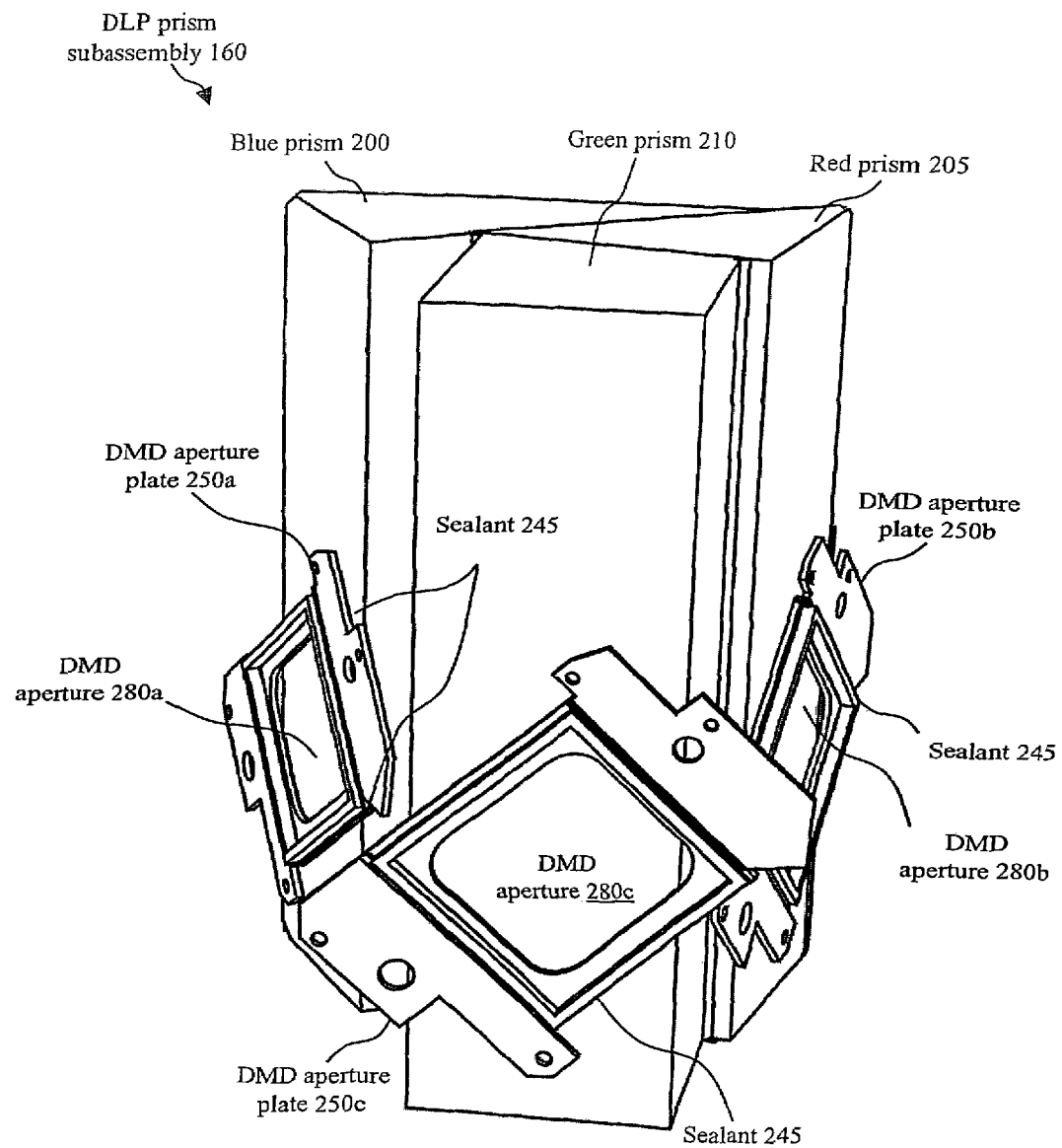
FIG. 3 illustrates a rear perspective view of a DLP-prism subassembly with DMD chips removed for viewing purposes in accordance with the invention.

FIG. 3 illustrates a rear perspective view of DLP prism subassembly 160. FIG. 3 includes a plurality of DMD apertures 280, i.e., DMD aperture 280a, 280b, and 280c. DMD apertures 280a, 280b, and 280c are openings in DMD aperture plates 250a, 250b, and 250c, respectively, and are slightly larger than the DMD chips 255a, 255b, and 255c. DLP prism subassembly 160 is a subassembly of DLP prism assembly 140 with DMD chips 255 (i.e., DMD chip 255a, DMD chip 255b, and DMD chip 255c) removed, so that DMD apertures 280a, 280b, and 280c, and sealant 245 can be viewed. Each DMD aperture 280 allows light to pass through to the corresponding DMD chip 255.

Figure 4A:
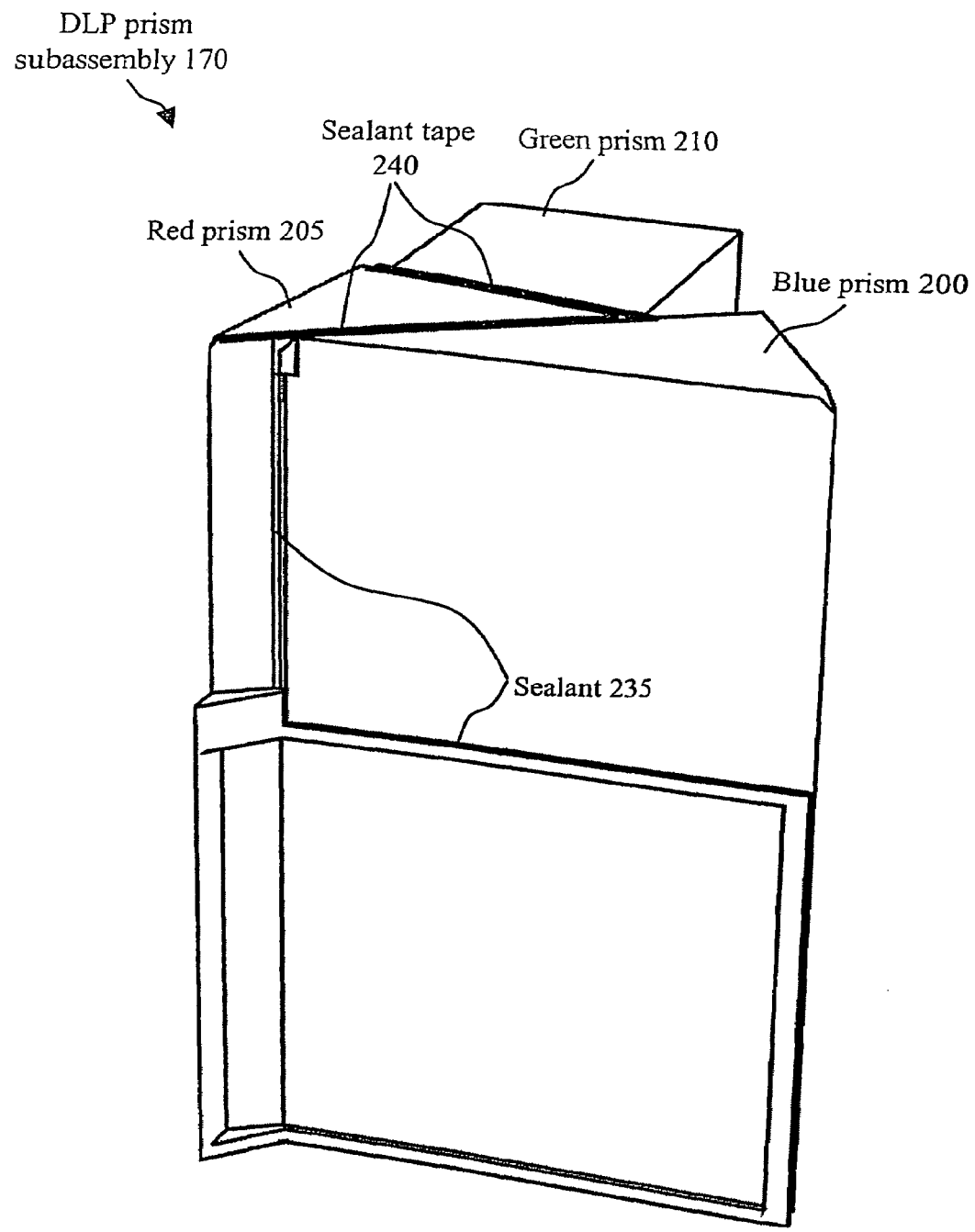
FIGS. 4A and 4B illustrate low right and left perspectives, respectively, of a DLP prism subassembly with the TIR-prism assembly and DLP chips removed for viewing purposes in accordance with the invention.
Figure 4B:
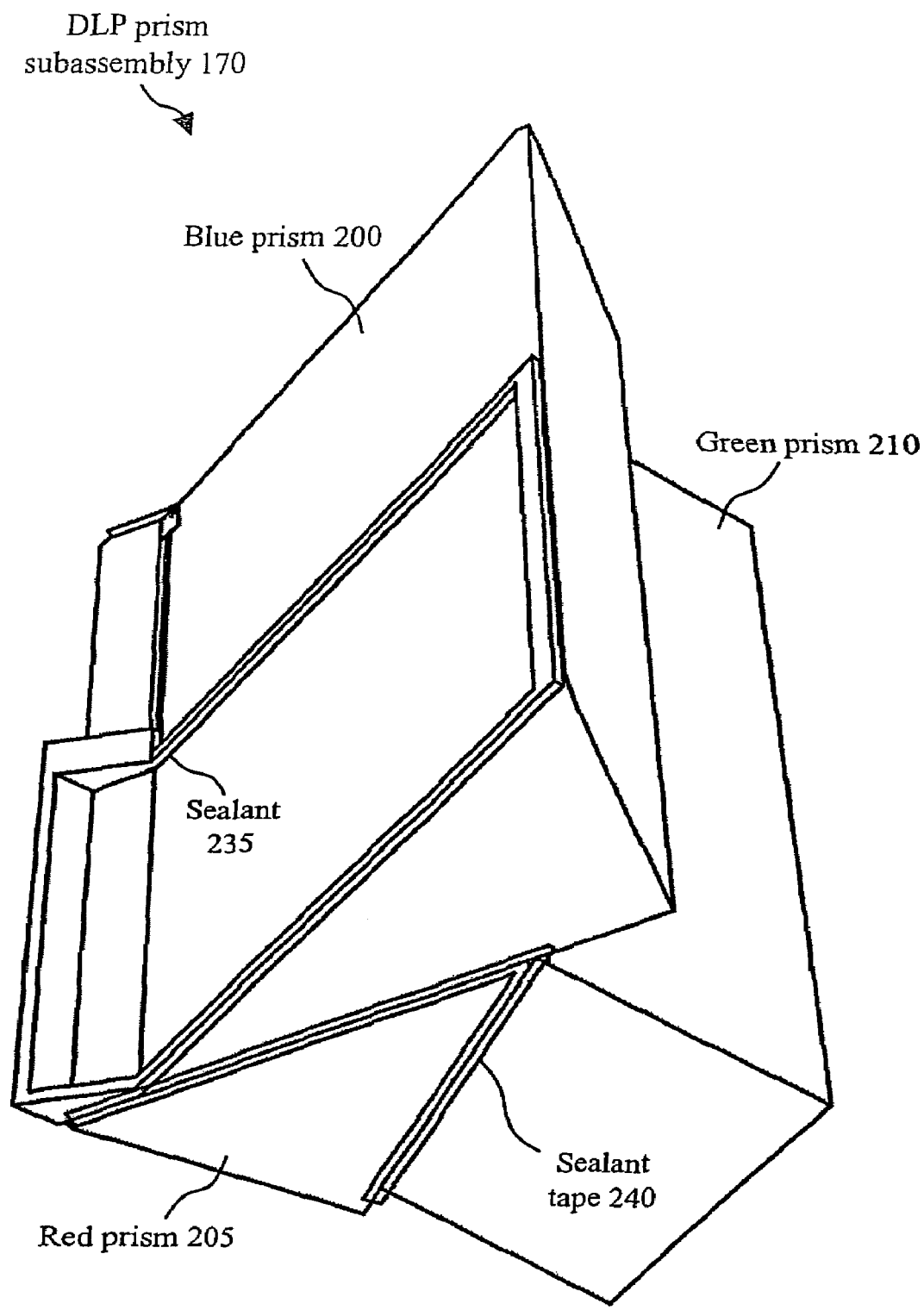

FIGS. 4A and 4B illustrate low right and bottom perspective views, respectively, of DLP prism subassembly 170. DLP prism subassembly 170 is a subassembly of DLP prism assembly 140 with TIR prism assembly 215, DMD aperture plates 250a, 250b, and 250c, and DMD chips 255a, 255b, and 255c removed for viewing purposes. Sealant 235, shown applied to the front of blue prism 200, must be no more than 1 mm in width in order to fulfill TIR conditions and prevent visual artifacts from appearing on the projected image. Sealant tape 240 is shown sealing the gaps between blue prism 200, red prism 205, and green prism 210, on the top of the DLP prism subassembly 170. Sealant 235 is shown sealing the gaps between the front of blue prism 200 and red prism 205. FIG. 4B shows sealant tape 240 sealing the gaps between blue prism 200, red prism 205, and green prism 210, on the bottom of the DLP prism subassembly 170.

In operation and with continuing reference to FIGS. 1, 2A, 2B, 2C, 3, 4A, and 4B, DLP prism apparatus 140 receives light from relay optic system 130. Light enters through TIR prism 215, and is reflected through DLP prism apparatus 140, where dichroic coatings split the light into red, green, and blue components. After the light is split, each component of light (i.e., red, green, and blue) passes through a DMD aperture 280 (i.e., DMD aperture 280a, which corresponds to blue prism 200, DMD aperture 280b, which corresponds to red prism 205, and DMD aperture 280c, which corresponds to green prism 210) and is reflected off a corresponding DMD chip 255 (i.e., DMD chip 255a, which corresponds to blue prism 200, DMD chip 255b, which corresponds to red prism 205, and DMD chip 255c, which corresponds to green prism 210) that is attached to the prism. Each DMD chip 255 then reflects its corresponding colored light (i.e., DMD chip 255a reflects blue light, DMD chip 255b reflects red light, and DMD chip 255c reflects green light). 'On-state' light is recombined and reflected through projection lens 150 onto the display screen, while 'off-state' light is absorbed within the projector. DMD aperture 280a corresponds to DMD chip 255a, DMD aperture 280b corresponds to DMD chip 255b, and DMD aperture 280c corresponds to DMD chip 255c, for modulation and reflection back to the projection lens. Sealant 235, glass 220, glass 225, glass 227, glass 230, tape sealant 240, and sealant 245 form a protective covering for the inner faces of blue prism 200, red prism 205, and green prism 210 and DMD chips 255a, 255b, and 255c from atmospheric contamination without the use of a metal box enclosure and, thus, permit better heat dissipation.

Figure 5A:
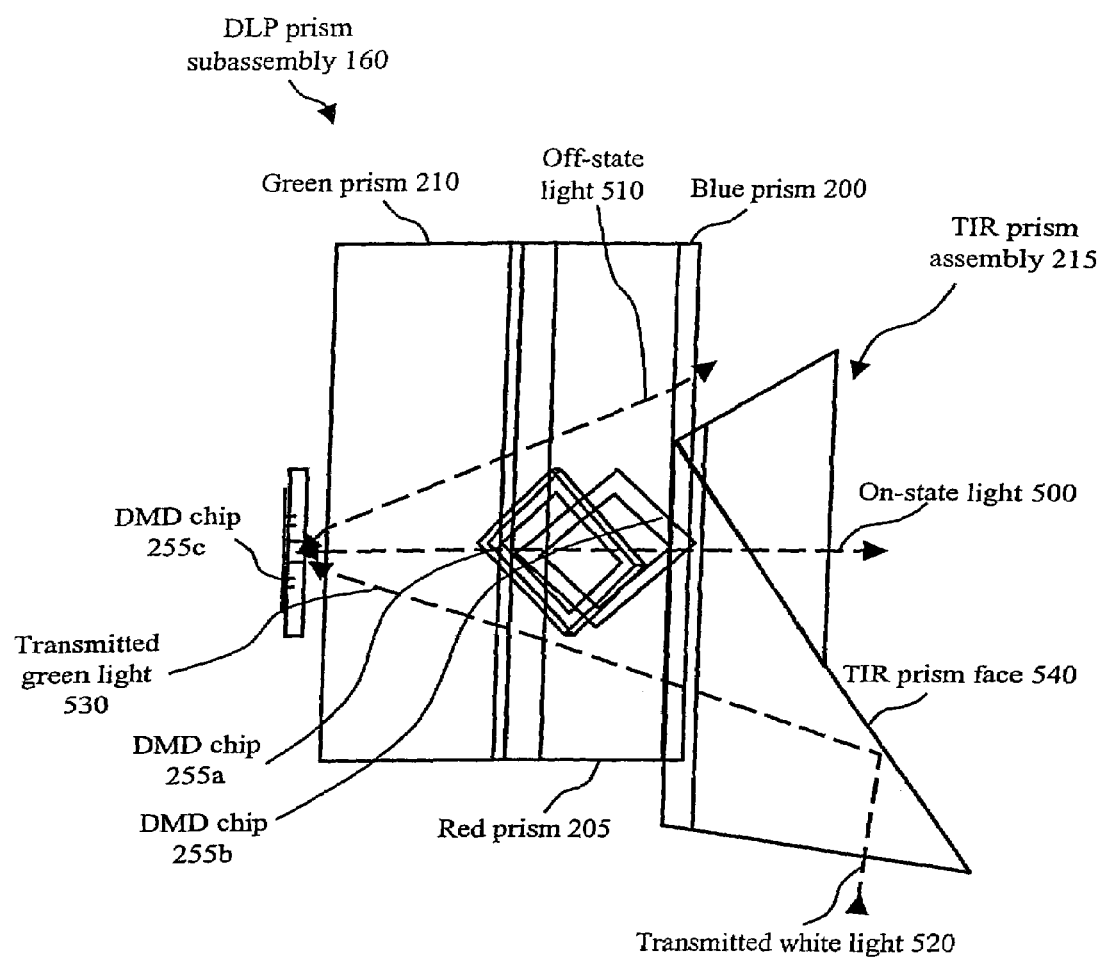
FIGS. 5A and 5B illustrate side and top views, respectively, of a DLP-prism subassembly with light paths shown, in accordance with the invention.

FIG. 5A illustrates a side view of DLP prism subassembly 160 with light paths for green light shown for viewing purposes. Blue prism 200, red prism 205, green prism 210, DMD chips 255a, 255b, and 255c, TIR prism assembly 215, on-state light 500, off-state light 510, transmitted white light 520, transmitted green light 530, and TIR prism face 540 are shown in this view. On-state light 500 is the light reflected from DMD chip 255c that is projected through projection lens 150. Off-state light 510 is the light reflected from DMD chip 255c that is not projected and is absorbed within the projector. Transmitted white light 520 is the white light entering the DLP prism apparatus 140 from optic relay lens 130. Transmitted green light 530 is green light that has been separated from blue and red components by passing through blue prism 200 and red prism 205. TIR prism face 540 is the front face of TIR prism assembly 215.

In operation, transmitted white light 520 enters TIR prism assembly 215 from the bottom and is reflected off TIR prism face 540 and through blue prism 200 and red prism 205 before reaching green prism 210. Blue and red light are filtered out of transmitted white light 520 by use of dichroic coatings on blue prism 200 and red prism 205. Transmitted green light 530 reaches DMD chip 255c, where it is selectively reflected into on-state light 500 or off-state light 510. On-state light 500 passes through green prism 210, red prism 205, blue prism 200, and TIR prism assembly 215, and is then projected. Off-state light 510 is reflected upwards within the projector and is not projected.

Figure 5B:
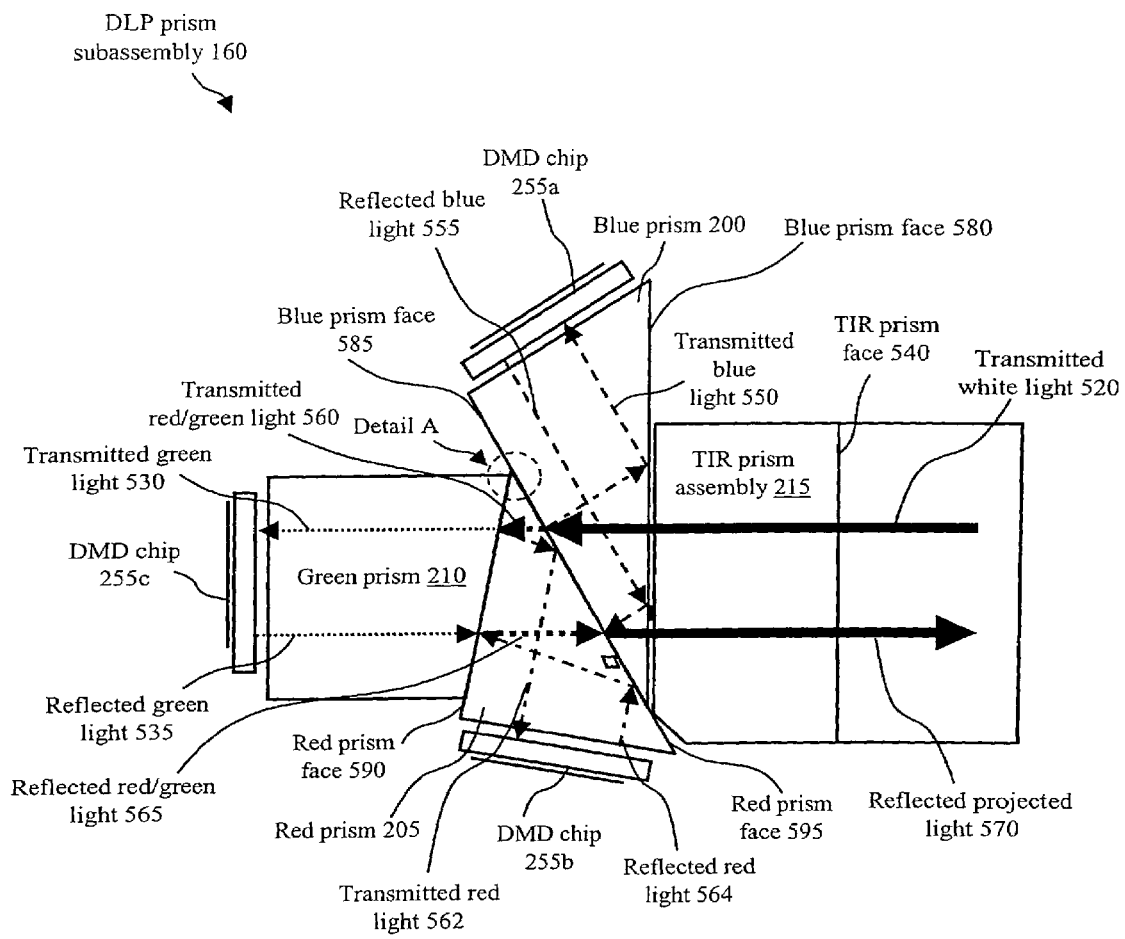

FIG. 5B illustrates a top view of DLP prism subassembly 160 with paths for on-state light shown for viewing purposes. Blue prism 200, red prism 205, green prism. 210, TIR prism assembly 215, DMD chips 255a, 255b, 255c, transmitted white light 520, transmitted blue light 550, reflected blue light 555, transmitted red/green light 560, transmitted red light 562, reflected red light 564, transmitted green light 530, reflected green light 535, reflected red/green light 565, reflected projected light 570, blue prism face 580, blue prism face 585, red prism face 590, red prism face 595, and TIR prism face 540 are shown in this view.

With reference to FIG. 5A, transmitted blue light 550 is blue light separated from transmitted white light 520. Reflected blue light 555 is blue light reflected off DMD chip 255a. Transmitted red/green light 560 is red and green light separated from transmitted white light 520. Transmitted red light 562 is red light separated from transmitted red/green light 560. Reflected red light 564 is red light reflected off DMD chip 255b. Transmitted green light 530 is green light separated from transmitted red/green light 560. Reflected green light 535 is green light reflected off DMD chip 255c. Reflected red/green light 565 is combined reflected red light 564 and reflected green light 535. Reflected projected light 570 is combined reflected blue light 555 and reflected red/ green light 565. Blue prism face 580 is a face of blue prism 200 used to reflect blue light by means of total internal reflection. Blue prism face 585 is a face of blue prism 200 used to separate blue light from transmitted white light 520 and to reflect blue light by means of said dichroic coating. Red prism face 590 is a face of red prism 205 used to separate red light from transmitted red/green light 565 and to reflect red light by means of said dichroic coating. Red prism 595 is a face of red prism 205 used to reflect red light by means of total internal reflection.

With continuing reference to FIGS. 5A and 5B, in operation, transmitted white light 520 enters TIR prism assembly 215 and is reflected by TIR prism face 540. Transmitted white light 520 reaches blue prism face 585, where transmitted blue light 550 is separated from transmitted white light 520 by use of a dichroic coating and is reflected. Transmitted blue light 550 is then reflected off blue prism face 580 to DMD chip 255a. DMD chip 255a reflects the light and sends on-state light 500 and reflected blue light 555, which is reflected off blue prism 200 and then blue prism face 580, to be recombined with the other reflected components of light, reflected red/green light 565.

Transmitted red/green light 560 reaches red prism face 590, where transmitted red light 562 is separated from transmitted red/green light 560 by use of a dichroic coating and is reflected. Transmitted red light 562 is then reflected off red prism face 595 to DMD chip 255b. DMD chip 255b reflects the light and sends on-state light 500 and reflected red light 564, which is reflected off red prism face 590 and recombined with reflected green light 535 into reflected red/green light 565.

Transmitted green light 530 reaches DMD chip 255c, where it is reflected. It then reaches red prism face 590, where it recombines with reflected red light 564 into reflected red/green light 565. Reflected red/green light 565 is combined with reflected blue light 555 into reflected projected light 570 and exits the DLP prism subassembly 160.

Figure 5C:
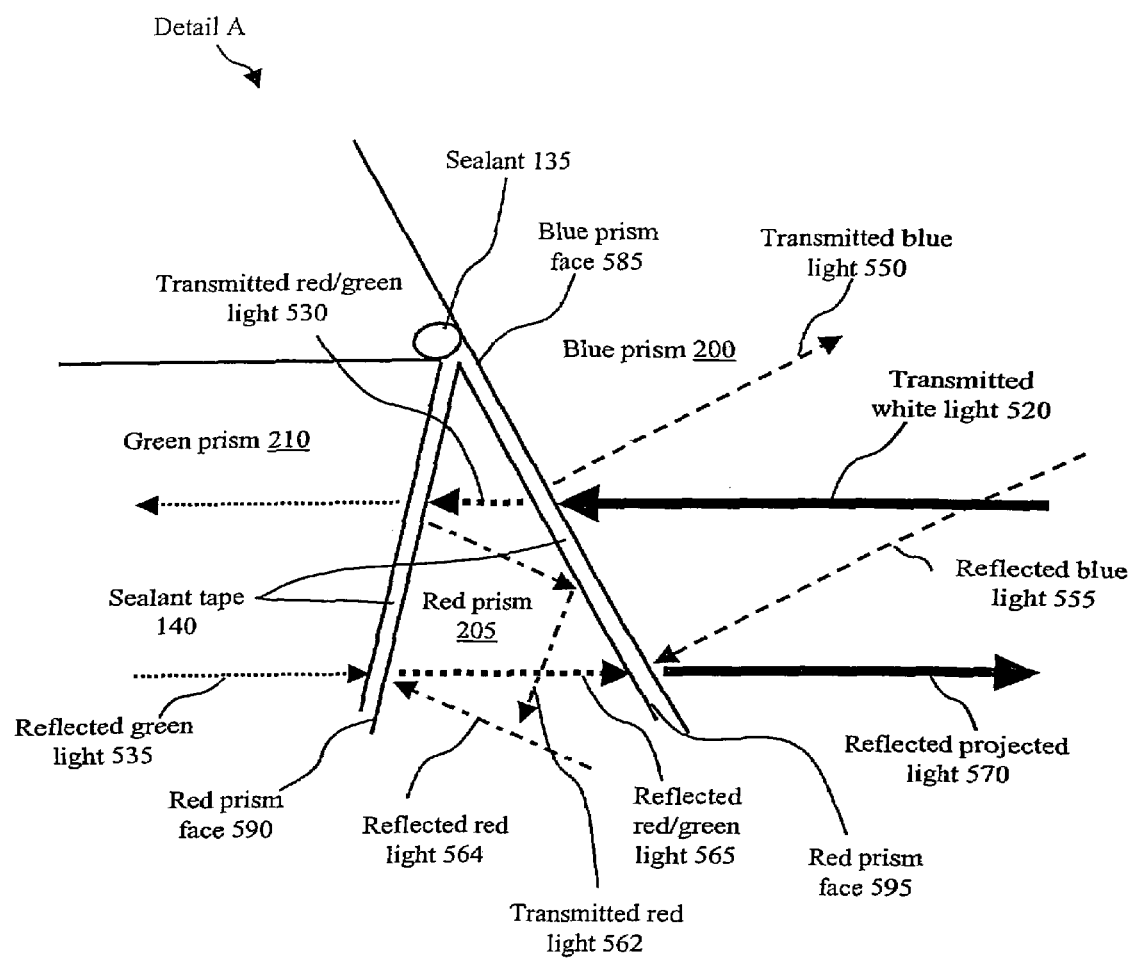
FIG. 5C illustrates a detail top view of a DLP-prism subassembly with light paths shown, in accordance with the invention.

With continuing reference to FIG. 5B, FIG. 5C illustrates Detail A of FIG. 5B, with light paths shown for viewing purposes. Sealant 135 and sealant tape 140 are shown in this view. Sealant 135 seals the vertical air gap at the intersection of blue prism 200, red prism 205, and green prism 210. Sealant tape 140 seals the air gaps between blue prism 200 and red prism 205 and between red prism 205 and green prism 210.

With continuing reference to FIGS. 1, 2A, 2B, 2C, 3, 4A, 4B, 5A, 5B, and 5C, the combined use of glasses 220, 225, 227 and 230, sealant 235, sealant tape 240, and sealant 245 protect DMD chips 255a, 255b, and 255c in generic DLP light engine system 100 from atmospheric contamination, while permitting sufficient heat dissipation. Thus, TIR conditions are fulfilled for transmitted white light 520, on-state light 500, off-state light 510, transmitted blue light 550, reflected blue light 555, transmitted red/green light 560, transmitted red light 562, reflected red light 564, reflected projected light 570, TIR prism face 540, blue prism face 580, and red prism face 595.

The present invention is in no way limited to the embodiment described above and represented in the drawings, but such a prism assembly may be realized in different shapes and dimensions, without departure from the scope of the present invention.

The invention claimed is:

1. A prism assembly comprising two or more prisms, at least one of which comprises one or more surfaces that are used for total internal reflection or partial spectral reflection of incoming light, wherein at least one of said surfaces used for reflection purposes is spaced apart from another prism such that a first air gap is formed between said prisms, said prism assembly further having an element that is spaced apart from said surface used for reflection purposes, such that a second air gap is defined in between said surface used for reflection purposes and said element, and such that said second air gap is adjacent to said first air gap such that the first and second air gaps share a common edge, said prism assembly further having a seal that seals an air gap formed by the combination of the first and second air gaps in order to prevent contaminants from entering said air gap and such that total internal reflection or partial spectral reflection of incoming light is not influenced by the presence of said seal.

2. The prism assembly according to claim 1, wherein said element comprises another prism of said prism assembly.

3. The prism assembly according to claim 1, wherein said element comprises a plate.

4. The prism assembly according to claim 1, wherein said seal comprises at least a sealant.

5. The prism assembly according to claim 4, wherein said sealant is heat resistant to temperatures up to 80° C. and is resistant to ultra violet light.

6. The prism assembly according to claim 4, wherein said sealant comprises silicone.

7. The prism assembly according to claim 4, wherein said sealant comprises silicone rubber.

8. A prism assembly comprising two or more prisms, at least one of which comprises one or more surfaces that are used for total internal reflection or partial spectral reflection of incoming light, wherein at least a part of one of said surfaces used for reflection purposes is covered with a plate element that is spaced apart from said surface, such that an air gap is defined in between said surface and said plate element, and wherein said air gap is sealed with a seal that is applied on one of said prisms in order to prevent contaminants from entering said air gag; and wherein said plate element comprises another prism of said prism assembly.

9. The prism assembly according to claim 8, wherein said seal comprises at least a sealant.

10. The prism assembly according to claim 9, wherein said sealant is heat resistant to temperatures up to 80° C. and is resistant to ultra violet light.

11. The prism assembly according to claim 9, wherein said sealant comprises silicone.

12. The prism assembly according to claim 9, wherein said sealant comprises silicone rubber.

13. The prism assembly according to claim 9, wherein said sealant is only applied on places of the prisms that are not involved in reflecting incoming light relevant for image building.

14. The prism assembly according to claim 13, wherein all parts of the surfaces reflecting incoming light relevant for image building are covered with said element.

15. A digital light processing prism apparatus comprising a total internal reflection (TIR) prism assembly and a color prism assembly, wherein the TIR-prism assembly comprises two triangular prisms extending in a first direction, said TIR-prisms facing each other with one of their surfaces, wherein the color prism assembly comprises a quadrangular prism and two triangular prisms which are oriented in a transversal direction in view of the TIR-prisms, and wherein the quadrangular prism has one surface facing a surface of a first of said color triangular prisms, said first triangular prism having a second surface facing a first surface of the second color triangular prism, said second color prism having a second surface, partially facing a surface of one of said TIR-prisms, wherein all of said facing surfaces are located at a mutual distance of each other, such that an air gap is formed in between each of said facing surfaces, and wherein said air gaps are sealed with a seal that is applied on said prisms.

16. The digital light processing prism apparatus according to claim 15, wherein each of the color prisms are provided at one of their surfaces with a light reflecting valve, wherein said light reflecting valves are spaced apart from the corresponding surfaces such that an air gap is formed in between said light reflecting valves and their correspondent surface, and wherein said air gaps are sealed with a seal applied on said light reflecting valves and said prisms.

17. The digital light processing prism apparatus according to claim 15, wherein the outwardly oriented surfaces of the TIR-prisms and the outwardly oriented surfaces of the color prisms that are usable for total internal reflection or partial spectral reflection of an image building part of the incoming light, are covered with an element that is spaced apart from said surface, such that an air gap is defined in between said surface and said element, and wherein said air gap is sealed with a seal that is applied on one of said prisms in order to prevent contaminants from entering said air gap.

* * * * *